(12) United States Patent
Yin et al.

(10) Patent No.: US 9,595,878 B2
(45) Date of Patent: Mar. 14, 2017

(54) DRIVE CIRCUIT FOR SYNCHRONOUS RECTIFIER AND METHOD THEREOF

(71) Applicant: General Electric Company, Schenectady, NY (US)

(72) Inventors: Lanlan Yin, Shanghai (CN); Yifeng Sun, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 70 days.

(21) Appl. No.: 14/514,824

(22) Filed: Oct. 15, 2014

(65) Prior Publication Data

US 2015/0117068 A1   Apr. 30, 2015

(30) Foreign Application Priority Data

Oct. 28, 2013 (CN) .......................... 2013 1 0517148

(51) Int. Cl.
   *H02M 3/335* (2006.01)

(52) U.S. Cl.
   CPC ..... *H02M 3/33592* (2013.01); *Y02B 70/1475* (2013.01)

(58) Field of Classification Search
   CPC .......... H02M 3/33592; H02M 3/33546; Y02B 70/1475
   USPC .......................... 363/21.06, 21.1, 21.14, 127
   See application file for complete search history.

(56) References Cited

U.S. PATENT DOCUMENTS

| 6,377,477 B1 * | 4/2002 | Xie ................... H02M 3/33592 363/20 |
| 6,839,246 B1 * | 1/2005 | Zhang ............... H02M 3/33592 363/127 |
| 7,589,982 B2 * | 9/2009 | Wang ................ H02M 3/33592 363/21.06 |

(Continued)

FOREIGN PATENT DOCUMENTS

| CN | 101527525 A | 9/2009 |
| CN | 101826810 A | 9/2010 |

OTHER PUBLICATIONS

Unofficial English Translation of Chinese Office Action and Search Report issued in connection with corresponding CN Application No. 201310517148.8 dated Sep. 18, 2016.

*Primary Examiner* — Adolf Berhane
*Assistant Examiner* — Alex Torres-Rivera
(74) *Attorney, Agent, or Firm* — GE Global Patent Operation; Stephen G. Midgley

(57) ABSTRACT

A power converter includes a primary side power circuit, a secondary side power circuit, and a synchronous rectifier drive circuit. The primary side power circuit includes a primary winding and a main switch coupled in series. The main switch is turned on and off in response to control signals. The secondary side power circuit includes a secondary winding, at least one synchronous rectifier switch, and an output inductor winding. The secondary winding is inductively coupled to the primary winding and forms a first magnetic coupling with the primary winding. The synchronous rectifier drive circuit includes a first and a second auxiliary winding coupled in series. The first auxiliary winding is inductively coupled to the primary winding and forms a second magnetic coupling with the primary winding. The second auxiliary winding is inductively coupled to (Continued)

the output inductor winding and forms a third magnetic coupling with the output inductor winding.

14 Claims, 10 Drawing Sheets

(56) References Cited

U.S. PATENT DOCUMENTS

| | | | | |
|---|---|---|---|---|
| 2002/0110005 A1* | 8/2002 | Mao | .................. | H02M 3/33592 363/21.06 |
| 2004/0109335 A1* | 6/2004 | Gan | .................. | H02M 3/33592 363/127 |
| 2011/0096578 A1 | 4/2011 | Fang et al. | | |
| 2014/0192561 A1* | 7/2014 | Plesnik | ............. | H02M 3/33546 363/21.06 |

* cited by examiner

DRIVE CIRCUIT FOR SYNCHRONOUS RECTIFIER AND METHOD THEREOF

BACKGROUND

Embodiments of the disclosure relate generally to direct current (DC) to DC power converters, and more particularly to, self-driven DC-DC synchronous rectifiers of forward type, improved drive circuit incorporated therein and method thereof.

Self-driven synchronous rectifiers of forward type are used as power conversion device for converting one form of DC electrical power to another, and has been applied in a wide range of applications, such as datacenters, communication devices etc. More specifically, the self-driven synchronous rectifiers can be operated to convert input DC voltage variable within a wide range into a constant output DC voltage and supply the constant output DC voltage to a particular load. However, various problems exist in association with the operation of the self-driven synchronous rectifiers of forward type. One problem is the drive circuit used in the self-driven synchronous rectifiers generates a lot of power loss and causes significant thermal stress to the entire system. These problems become even more challenging when the input DC voltage has a high voltage value.

Therefore, it is desirable to provide systems and methods to address one or more of the above-mentioned problems and/or requirements.

BRIEF DESCRIPTION

In accordance with one aspect of the present disclosure, a power converter is provided. The power converter includes a primary side power circuit, a secondary side power circuit, and a synchronous rectifier drive circuit. The primary side power circuit includes a primary winding and a main switch coupled in series with the primary winding. The main switch is configured to be turned on and off in response to main switch control signals supplied thereto. The secondary side power circuit includes a secondary winding, at least one synchronous rectifier switch, and an output inductor winding. The secondary winding is inductively coupled to the primary winding and forms a first magnetic coupling with the primary winding. The synchronous rectifier drive circuit includes a first auxiliary winding and a second auxiliary winding coupled in series with the first auxiliary winding. The first auxiliary winding is inductively coupled to the primary winding and forms a second magnetic coupling with the primary winding. The second auxiliary winding is inductively coupled to the output inductor winding and forms a third magnetic coupling with the output inductor winding.

In accordance with another aspect of the present disclosure, a self-driven DC-DC power converter of forward type is provided. The self-driven DC-DC power converter of forward type includes a transformer, a synchronous rectifier switch, a synchronous freewheeling switch, an output inductor winding, and a second auxiliary winding. The transformer includes a primary winding, a secondary winding, and a first auxiliary winding wound around a common core, the secondary winding having a first terminal and a second terminal, the first auxiliary winding having a first terminal and a second terminal. The synchronous rectifier switch includes a source terminal, a drain terminal, and a gate terminal. The drain terminal of the synchronous rectifier switch is coupled to the second terminal of the secondary winding, the gate terminal of the synchronous rectifier switch coupled to the first terminal of the first auxiliary winding. The synchronous freewheeling switch includes a source terminal, a drain terminal, and a gate terminal. The source terminal of the second synchronous rectifier is coupled to the source terminal of the first synchronous rectifier switch, the drain terminal of the synchronous freewheeling switch coupled to the first terminal of the secondary winding. The output inductor winding is coupled in series with the secondary winding. The second auxiliary winding is inductively coupled with the output inductor winding. The second auxiliary winding includes a first terminal and a second terminal. The first terminal of the second auxiliary winding is coupled to the second terminal of the first auxiliary winding and the gate terminal of the second synchronous rectifier switch.

In accordance with another aspect of the present disclosure, a method of operating a power converter is provided. The method includes the following steps: providing a first drive voltage having positive polarity at a first terminal of a first auxiliary winding in response to a turn-on signal supplied to a main switch of the power converter; providing a second drive voltage having negative polarity at a first terminal of a second auxiliary winding, wherein the second auxiliary winding is inductively coupled to an output inductor of the power converter and is coupled in series with the first auxiliary winding; and combining the first drive voltage and the second drive voltage to turn on a synchronous rectifier switch of the power converter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
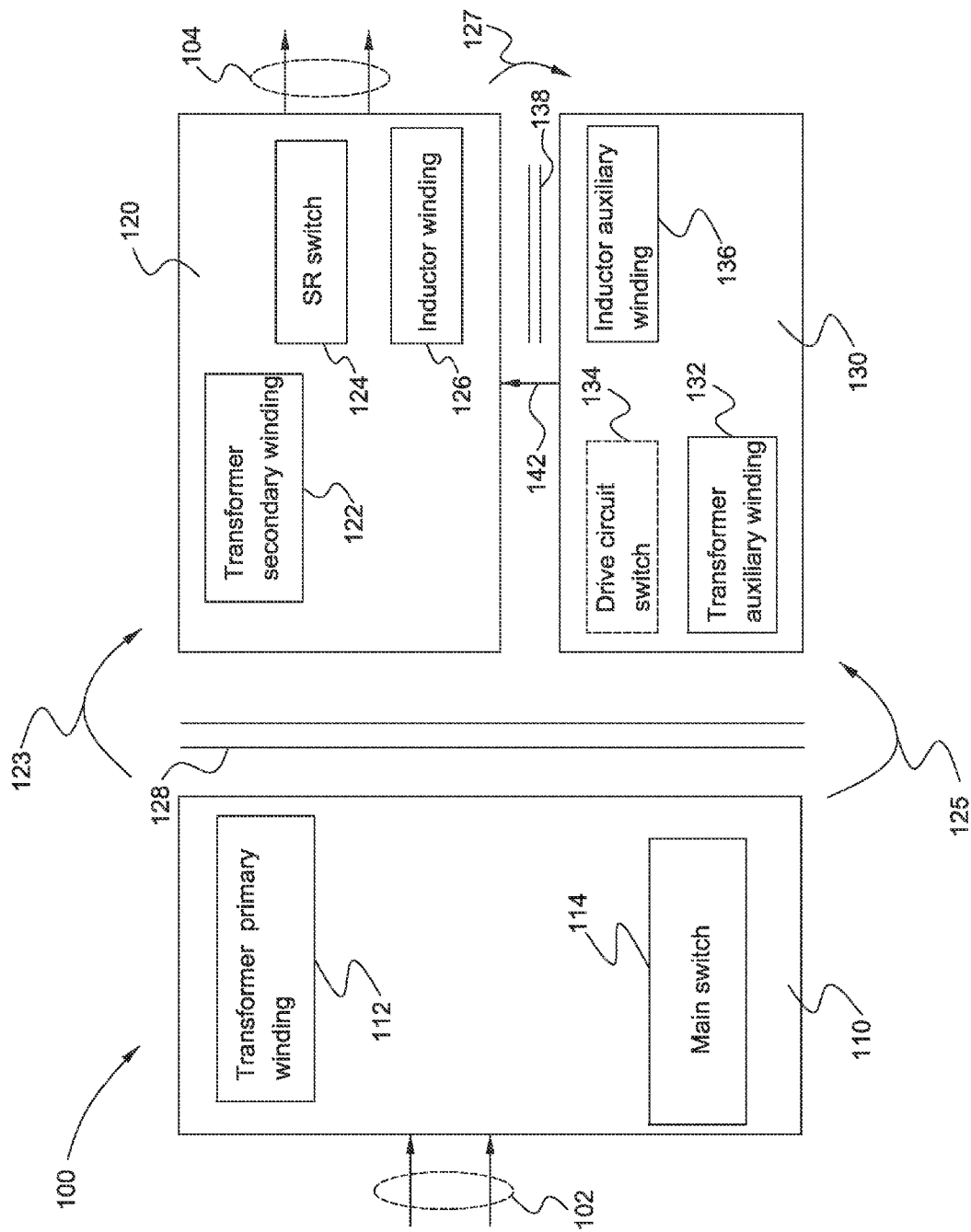
FIG. 1 is a block diagram of a power converter in accordance with an exemplary embodiment of the present disclosure.

In general, embodiments of the present disclosure are directed to self-driven synchronous rectifiers of forward type used to convert electrical power received from an input power source and provide output electrical power to a particular load. In particular, new solutions of improved drive circuits are proposed to be used in active clamped self-driven synchronous rectifiers of forward type (herein after referred to as "synchronous rectifiers"). More specifically, a magnetic coupling is established by inductively connecting an output inductor winding with an inductor auxiliary winding. The inductor auxiliary winding is further arranged to be in electrical connection with a transformer auxiliary winding. As such, during normal operation, the drive circuits used in the synchronous rectifiers can be operated with reduced or lower power loss by combining a first induced voltage developed at the transformer auxiliary winding and a second induced voltage developed at the inductor auxiliary winding. More specifically, the power loss generated by the drive circuits is significantly reduced when the synchronous rectifiers is operating at a high input voltage value. Reduced or lower power loss in turn leads to a reduced thermal stress on the drive circuits as well as to the synchronous rectifiers or the entire power converter.

In some specific embodiments, the above-mentioned output inductor winding and the inductor auxiliary winding can be wound around the same magnetic core. In addition, to facilitate easy manufacturing of such an improved solution, the output inductor winding and the inductor auxiliary winding can be embedded within a printed circuit board (PCB) either in the same layer or in different layers.

In some specific embodiments, the multiple windings used in the synchronous rectifiers, e.g., primary winding, secondary winding, transformer auxiliary winding, output inductor winding, and inductor auxiliary winding can be arranged to satisfy a particular turn ratio equation. In this particular case, one or more switching devices used in the conventional or some of the newly proposed drive circuits can be eliminated, thereby a totally passive type drive circuits is provided for further reducing the power loss generated thereof. Also, the passive version drive circuits can bring down the total cost of the synchronous rectifiers in some extent.

In some specific embodiments, the drive circuits may employ one or more resistive elements to adjust the dead time inserted between the control signals or gating signals supplied to synchronous rectifier switches that are operated in complementary manner, such that the synchronous rectifiers can be operated more reliably or short-circuit conditions can be avoided.

Implementing the newly proposed synchronous rectifiers or more specifically the improved drive circuits used in the synchronous rectifiers can solve one or more technical problems or can achieve a variety of technical advantages and/or benefits. One technical advantage and/or benefit is that the power loss generated by the drive circuits or the synchronous rectifiers is reduced, thereby the efficiency of the synchronous rectifiers is improved. Another technical advantage and/or benefit is that the cost of the synchronous rectifiers can be reduced for some special designs of the drive circuits. Other technical advantages or benefits will become apparent to those skilled in the art by referring to the detailed descriptions and accompanying drawings provided below in accordance with one or more embodiments of the present disclosure.

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the term "controller" may include either a single component or a plurality of components, which are either active and/or passive and may be optionally be connected or otherwise coupled together to provide the described function.

FIG. 1 illustrates a block diagram of a power converter 100 in accordance with an exemplary embodiment of the present disclosure. As illustrated in FIG. 1, the power converter 100 includes a primary side power circuit 110, a secondary side power circuit 120, and a drive circuit 130. The primary side power circuit 110 is electrically isolated from both the secondary side power circuit 110 and the drive circuit 130 via a transformer (not labeled) having a magnetic core 128. In the illustrated embodiments, the transformer is used to transfer electrical power from the primary side power circuit 110 to the secondary side power circuit 120. Also, the transformer is used to convey signals indicative operation of the primary side power circuit 110 to the drive circuit 130. More specifically, in the illustrated embodiment, the primary side power circuit 110 includes a primary winding 112, which is inductively coupled to a secondary winding 122 of the secondary side power circuit 120 via the magnetic core 128, thereby a first magnetic coupling designated as 123 is formed between the primary side power circuit 110 and the secondary side power circuit 120. Through the first magnetic coupling 123, input electrical power (e.g., electrical power having varies DC voltage values) received from input ports 102 of the primary side power circuit 110 can be converted to output electrical power and provided at output ports 104 of the secondary side power circuit 120.

In some embodiments, the primary winding 112 of the primary side power circuit 110 is further inductively connected to a transformer auxiliary winding 132 of the drive circuit 130, thereby a second magnetic coupling designated as 125 is formed between the primary side power circuit 110 and the drive circuit 130. In particular arrangements, through the second magnetic coupling 125, signals indicative of the operation of the primary side power circuit 110 is conveyed to the drive circuit 130. More specifically, in one embodiment, the primary side power circuit 110 includes a main switch 114 which is capable of being turned on and/off in response to control signals or gating signals provided from a controller (not illustrated), to selectively coupling the electrical power from the primary side power circuit 110 to the secondary side power circuit 120. Suitable devices that can be used as the main switch 114 may include semiconductor type switching devices, including but not limited to, bipolar junction transistor (BJT), metal oxide semiconductor field effect transistor (MOSFET), insulated gate bipolar transistor (IGBT), and integrated gate commutated thyristor (IGCT). Further, when the main switch 114 is operated to perform on and/off switching actions, inductive voltage developed at the transformer auxiliary winding 132 can be used to indicate timing sequence of the control signals or gating signals supplied to the main switch 114. The inductive voltage developed at the transformer auxiliary winding 132 is used by the drive circuit 130 for providing driving signals 142 to the secondary side power circuit 120. In particular, the driving signals 142 are supplied to one or more synchronous rectifier switches 124 of the secondary side power circuit 120 to allow the synchronous rectifier switches 124 to be turned on and/off synchronously with the main switch or primary switch 114, such that the electrical energy stored in the secondary winding 122 can be coupled to the output port 104 and provided to a particular load (not illustrated).

In some embodiments, as shown in FIG. 1, the secondary side power circuit 120 may further include one or more output inductors (also referred to as output inductor winding) 126 which is coupled between the secondary winding 122 and the output port 104. The one or more output inductor windings 126 are used to filter the electrical power and provide stable output electrical power to the load.

In some embodiments, as shown in FIG. 1, the output inductor winding 126 is further arranged to be inductively connected to an inductor auxiliary winding 136 of the drive circuit 130 through a second magnetic core 138, thereby a third magnetic coupling designated as 127 is formed or established between the secondary side power circuit 120 and the drive circuit 130. Through the third magnetic coupling 127, an inductive voltage developed at the inductor auxiliary winding 136 can be used to indicate timing sequence of the synchronous rectifier switches 124 of the secondary side power circuit 120. In one embodiment, the induced voltage developed at the inductor auxiliary winding 136 is combined with the induced voltage developed at the transformer auxiliary winding 132 in a particular way, such that the power consumption generated by the drive circuit switch 134 is reduced, which in turns leads to a reduced thermal stress at the drive circuit 130 and the entire power converter or synchronous rectifier 100. In some embodiments, the turns of the primary winding, the secondary winding 122, the transformer auxiliary winding 132, the output inductor winding 126, and the inductor auxiliary winding 136 can be set to satisfy a particular condition or equation, such that the driving switch 134 used in the drive circuit 130 can be eliminated. Thus, the cost of the drive circuit 130 and/or the synchronous rectifier 100 can be reduced in some extent.

Figure 2:
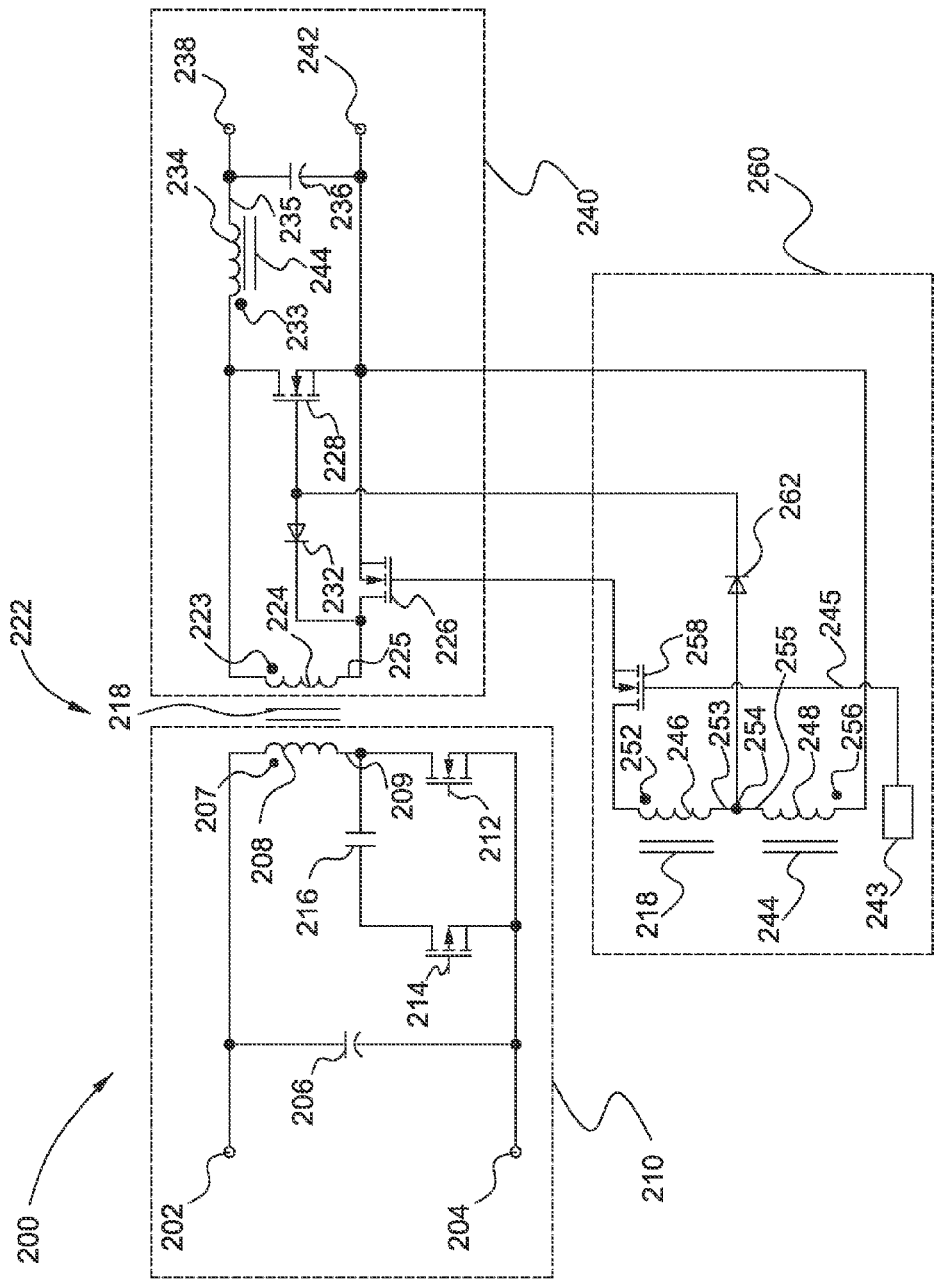
FIG. 2 is a detailed circuit diagram of a power converter in accordance with one exemplary embodiment of the present disclosure.

FIG. 2 is a detailed circuit diagram of a power converter 200 in accordance with one exemplary embodiment of the present disclosure. In some embodiments, the power converter 200 shown in FIG. 2 is a DC-DC power converter, or more specifically, a self-driven synchronous rectifier of forward type, or in particular arrangements, an active clamp self-driven synchronous rectifier of forward type. It is contemplated that the principles described herein can be applied to other synchronous rectifiers, such as non-active clamp synchronous rectifier, or active clamp synchronous rectifier having a difference circuit topology than the one shown in FIG. 2.

In the embodiment shown in FIG. 2, the power converter 200 includes a primary side power circuit 210 The primary side power circuit 210 includes a primary winding 208, main switch 212, active clamping switch 214, and a capacitor 216. The primary winding 208 includes a first terminal 207 and a second terminal 209. The first terminal 207 is electrically coupled to a first input port 202, the second terminal 209 is electrically coupled to a drain terminal of the main switch 212 and further be electrically coupled to one terminal of the capacitor 216. The other terminal of the capacitor 216 is electrically coupled to a drain terminal of the active clamping switch 214. The source terminal of the main switch 212 and the source terminal of the active clamping switch 214 are coupled together and are jointly coupled to a second input port 204. The gate terminal of the main switch 212 and the gate terminal of the active clamping switch 214 are electrically coupled to a controller (not illustrated) for receiving control signals or gating signals generated therefrom. In some embodiments, the primary side power circuit 210 can optically include an input capacitor 206 which is electrically coupled between the first input port 202 and the second input port 204.

Further referring to FIG. 2, in one embodiment, the power converter 200 further includes a secondary side power circuit 240 which is electrically isolated from the primary side power circuit 210 via a transformer 222. The secondary side power circuit 240 includes a secondary winding 224, an output inductor winding 234, a synchronous rectifier switch 226, a synchronous freewheeling switch 228, and a diode 232. In one embodiment, the secondary winding 224 shares the same magnetic core 218 with the primary winding 208 of the primary side power circuit 210, such that a first magnetic coupling can be formed therebetween. The secondary winding 224 includes a first terminal 223 and a second terminal 225. The first terminal 223 of the secondary winding 224 is electrically coupled to a first terminal 233 of the output inductor winding 234, and is further electrically coupled to a drain terminal of the synchronous freewheeling switch 228. The second terminal 225 of the secondary winding 224 is electrically coupled to the drain terminal of the synchronous rectifier switch 226.

Further referring to FIG. 2, in one embodiment, the output inductor winding 234 is wound around a second magnetic core 244. As described earlier, the first terminal 233 of the output inductor winding 234 is electrically coupled to the first terminal 223 of the secondary winding 224 as well as the drain terminal of the synchronous freewheeling switch 228. In addition, the output inductor winding 234 has a second terminal 235 electrically coupled to a first output port 238.

In one embodiment, the source terminal of the synchronous rectifier switch 226 and the source terminal of the synchronous freewheeling switch 228 is electrically coupled together. In some embodiments, the sources terminal of the synchronous rectifier switch 226 and the synchronous freewheeling switch 228 is jointly coupled to ground. It should be noted that the synchronous rectifier switch 226 and the synchronous freewheeling switch 228 can be suitable semiconductor type switches, including but not limited to, bipolar junction transistor (BJT), metal oxide semiconductor field effect transistor (MOSFET), insulated gate bipolar transistor (IGBT), and integrated gate commutated thyristor (IGCT).

With continuing reference to FIG. 2, the diode 232 has a positive terminal (or anode) electrically coupled to the gate terminal of the synchronous freewheeling switch 228, and a negative terminal (or cathode) electrically coupled to the drain terminal of the synchronous rectifier switch 226. In some embodiments, the secondary side power circuit 240 may further include an output capacitor 236 which is electrically coupled between the first output port 238 and the second output port 242.

Further referring to FIG. 2, in one embodiment, the power converter 200 further includes a drive circuit 260 which is magnetically coupled to the secondary side power circuit 240. In some embodiments, the drive circuit 260 may include a first auxiliary winding (or referred to as transformer auxiliary winding) 246 and a second auxiliary winding (or referred to as inductor auxiliary winding) 248, a drive circuit switch 258, and a first diode 262. The transformer auxiliary winding 246 is also wound around the first magnetic core 218, such that a second magnetic coupling can be formed or established between the transformer primary winding 208 and the transformer auxiliary winding 246. In one embodiment, the transformer auxiliary winding 246 includes a first terminal 252 and a second terminal 253. The first terminal 252 of the transformer winding 246 is electrically coupled to the drain terminal of the drive circuit switch 258. The second terminal 253 of the transformer auxiliary winding 246 is electrically coupled to a first terminal 255 of the inductor auxiliary winding 248 and the anode of the first diode 262, thereby a joint connection point 254 is formed. The inductor auxiliary winding 248 is wound around the second magnetic core 244, such that a third magnetic coupling is formed or established between the output inductor winding 234 and the inductor auxiliary winding 248.

As described earlier, the first terminal 255 of the inductor auxiliary winding 248 is electrically coupled to the second terminal 253 of the transformer auxiliary winding 246. In addition, the inductor auxiliary winding 248 has a second terminal 256 electrically coupled to the source terminals of the synchronous rectifier switch 226 and the synchronous freewheeling switch 228 and is also coupled to ground.

In some specific embodiments, the output inductor winding 234 and the inductor auxiliary winding 248 can be embedded within the same layer of a printed circuit board (PCB) to facilitate easy manufacturing of the power converter 200. In some other embodiments, the output inductor winding 234 and the inductor auxiliary winding 248 can be embedded within different layers of the PCB.

As is further shown in FIG. 2, the source terminal of the drive circuit switch 258 is electrically coupled to the gate terminal of the synchronous rectifier switch 226 of the secondary side power circuit 240. The gate terminal of the drive circuit switch 258 is electrically coupled to one terminal of a voltage source 243. In one embodiment, the voltage source 243 is configured to provide a constant bias voltage to the gate terminal of the drive circuit switch 258.

Further referring to FIG. 2, as described earlier, the anode of the first diode 262 is electrically coupled to the joint connection point 254 formed between the transformer auxiliary winding 246 and the inductor auxiliary winding 248. In addition, the first diode 262 has a cathode which is electrically coupled to the gate terminal of the synchronous freewheeling switch 228.

Figure 4:
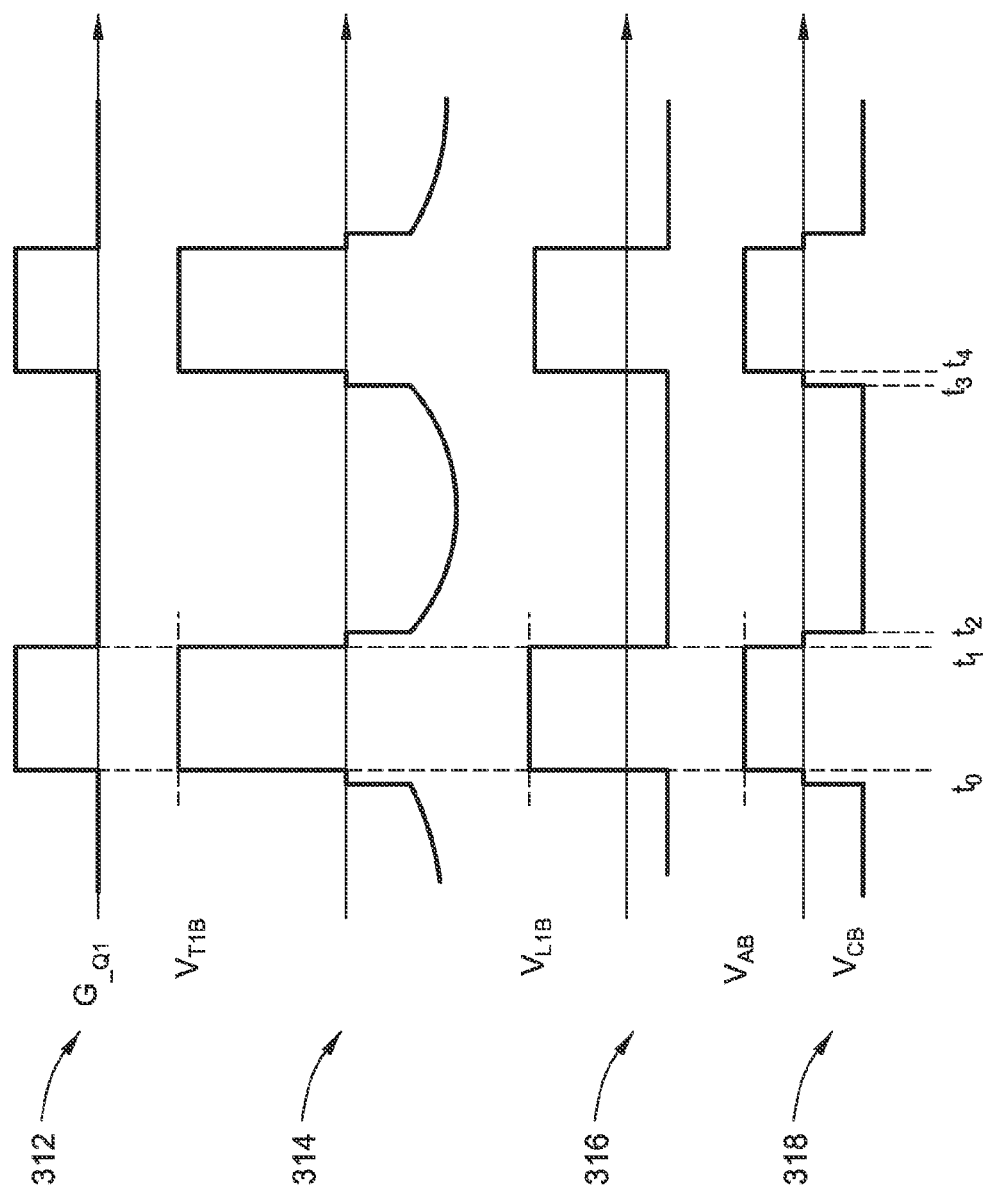
FIG. 4 shows various waveform diagrams generated in association with the operation of the power converters shown in FIG. 2 and/or FIG. 3 in accordance with an exemplary embodiment of the present disclosure.

The operation of the power converter 200 shown in FIG. 2 will be described in detail with reference to FIG. 4, which shows various waveform diagrams generated in association with the operation of the power converter 200. As illustrated in FIG. 4, a first waveform 312 represents the timing sequence of the control signals or gating signals applied to the main switch 212. A second waveform 314 shown in FIG. 4 represents the inductive voltage developed at the first terminal 252 of the transformer auxiliary winding 246 as a function of time. A third waveform 316 shown in FIG. 4 represents the inductive voltage developed at the second terminal 256 of the inductor auxiliary winding 248 as a function of time. A fourth waveform 318 represents the voltage between the first terminal 252 of the transformer auxiliary winding 246 and the second terminal 256 of the inductor auxiliary winding 248 as a function of time.

In operation, the main switch 212 is turned on in response to main switch control signals during time period of $t_0$-$t_1$. The primary side power circuit 210 receives input DC voltage at the first and second input ports 202, 204 and the input DC voltage is applied to the primary winding 208 such that magnetic energy is stored therein. The magnetic energy in turn is coupled to the secondary winding 224 of the secondary side power circuit 240 through the first magnetic coupling, and a positive voltage is induced at the first terminal 223 of the secondary winding 224. When the main switch 212 is turned on, the magnetic energy stored in the primary winding 208 is also coupled to the transformer auxiliary winding 246 through the second magnetic coupling, and a positive voltage $V_{T1B}$ (as indicated by 314 shown in FIG. 4) is induced at the first terminal 252 of the transformer auxiliary winding 246. The positive voltage $V_{T1B}$ induced at the first terminal 252 of the of the transformer auxiliary winding 246 can be expressed by the following equation:

$$V_{T1B} = V_{in} \cdot N_{as}/N_p \quad (1),$$

where $V_{in}$ is the input voltage applied at the first and second input ports 202, 204, $N_{as}$ is the turn of the transformer auxiliary winding 246, $N_p$ is the turn of the primary winding 208. It can be seen from equation (1) that, at a fixed turn ratio of the transformer auxiliary winding 246 and the primary winding 208, the induced voltage $V_{T1B}$ is in proportion to the input voltage $V_{in}$.

In addition, during the time period of $t_0$-$t_1$, the magnetic energy stored in the secondary winding 224 is further released to the output inductor winding 234 and positive voltage is induced at the first terminal 233 of the inductor winding 234. Also, a positive voltage $V_{L1B}$ (as indicated by 316 shown in FIG. 4) is induced at the second terminal 256 of the inductor auxiliary winding 248 through the third magnetic coupling. The positive induced voltage $V_{L1B}$ can be expressed by the following equation:

$$V_{L1B} = (V_{in} \cdot N_s/N_p - V_o) \cdot N_{al}/N_l \quad (2),$$

where $V_{in}$ is the input voltage applied at the first and second input ports 202, 204, $N_s$ is the turn of the secondary winding 224, $N_p$ is the turn of the primary winding 208, $V_o$ is the output voltage at the first and second output ports 238, 242, $N_{al}$ is the turn of inductor auxiliary winding 248, $N_l$ is the turn of the output inductor winding 244. It can be seen from equation (2) that the induced voltage developed at the second terminal 256 of the inductor auxiliary winding 248 is depending from the input voltage $V_{in}$ and the output voltage $V_o$.

From equations (1) and (2), the voltage $V_{AB}$ (as indicated by 318 shown in FIG. 4) between the two terminals 252, 256 or between the terminal 252 and ground can be obtained by subtracting the induced voltage $V_{L1B}$ at the second terminal 256 of the inductor auxiliary winding 248 from the induced voltage $V_{T1B}$ at the first terminal 252 of the transformer auxiliary winding 246, and can be expressed by the following equation:

$$V_{AB} = V_{T1B} - V_{L1B} = V_{in} \cdot \left( \frac{N_{as}}{N_p} - \frac{N_s}{N_p} \cdot \frac{N_{al}}{N_l} \right) + V_o \cdot N_{al}/N_l. \qquad (3)$$

As shown in FIG. 4, the magnitude of the voltage difference $V_{AB}$ is significantly smaller than the induced voltage $V_{T1B}$. Since the drive circuit switch 258 is supplied with a constant voltage 245 at its gate terminal, the drive circuit switch 258 is turned on when the positive voltage $V_{AB}$ is applied to the drain terminal of the drive circuit switch 258. As a result, the synchronous rectifier switch 226 is turned on in response to a control signal or gating signal supplied from the drain terminal of the drive circuit switch 258. Comparing to the traditional design that directly using the induced voltage developed at the first terminal 252 of the transformer auxiliary winding 246 for driving the drive circuit switch 258, power consumption generated by the drive circuit switch 258 can be significantly reduced by introducing the induced voltage developed at the second terminal 256 of the inductor auxiliary winding 248 for reducing the magnitude of the voltage supplied to the drain terminal of the drive circuit switch 258. Consequently, reduced power consumption results in a reduced thermal stress on the drive circuit 260 and/or the power converter 200.

In addition, the first diode 262 in the drive circuit 260 is off, when the voltage at the anode of the first diode 262 is negative. Therefore, the synchronous freewheeling switch 228 is turned off. Further, the first diode 232 in the secondary side power circuit 240 is clamped to a low level voltage due to the conduction of the synchronous rectifier switch 226. As a result, the synchronous freewheeling switch 228 can be reliably turned off or maintained at the off status.

With further reference to FIG. 4, during time period of $t_2$-$t_3$, the main switch 212 is turned off in response to main switch control signals or gating signals (as indicated by 312 shown in FIG. 4) supplied from a controller (not shown). The DC voltage received at the first and second input ports 202, 204 is stopped from being applied to the primary winding 208. The primary winding 208 releases the magnetic energy through the second magnetic coupling to cause a negative voltage $V_{T1B}$ (as indicated by 314 shown in FIG. 4) induced at the first terminal 252 of the transformer auxiliary winding 246. The negative voltage $V_{T1B}$ can be expressed by the following equation:

$$V_{T1B} = V_{in} \cdot D/(1-D) \cdot N_{as}/N_p \qquad (4),$$

where $V_{in}$ is the input voltage applied at the first and second input ports 202, 204, $N_{as}$ is the turn of the transformer auxiliary winding 246, $N_p$ is the turn of the primary winding 208, D represents the duty ratio of the control signals or gating signals supplied to the main switch 212.

In addition, during the time period of $t_2$-$t_3$, the secondary winding 224 releases magnetic energy to the output inductor winding 234 to cause a negative voltage to be induced at the first terminal 233 of the output inductor winding 234. Further, the second terminal 256 of the inductor auxiliary winding 248 is induced with a negative voltage $V_{L1B}$ (as indicated by 316 shown in FIG. 4). The negative voltage $V_{L1B}$ can be expressed by the following equation:

$$V_{L1B} = V_o \cdot N_{al}/N_l \qquad (5),$$

where $V_o$ is the output voltage at the first and second output ports 238, 242, $N_{al}$ is the turn of inductor auxiliary winding 248, $N_l$ is the turn of the output inductor winding 244. In this case, the drive circuit switch 258 is turned off in response to the negative voltage $V_{AB}=V_{T1B}-V_{L1B}$ applied at the drain terminal of the drive circuit 258. As a result, the synchronous rectifier switch 226 is turned off accordingly.

In addition, during the time period of $t_2$-$t_3$, the joint connection point 254 between the transformer auxiliary winding 246 and the inductor auxiliary winding 248 has a positive voltage $V_{CB}$, which can be expressed by the following expression:

$$V_{CB} = V_o \cdot N_{al}/N_l \qquad (6),$$

where $V_o$ is the output voltage at the first and second output ports 238, 242, $N_{al}$ is the turn of inductor auxiliary winding 248, $N_l$ is the turn of the output inductor winding 244. It can be seen from equation (6) that the magnitude of the voltage $V_{CB}$ is independent from the input voltage $V_{in}$. The first diode 262 in the drive circuit 260 conducts in response to the positive voltage $V_{CB}$, which further causes the synchronous freewheeling switch 228 in the secondary side power circuit 240 to be turned on, such that the output ports 238, 242 can provide stable DC voltage output.

Figure 3:
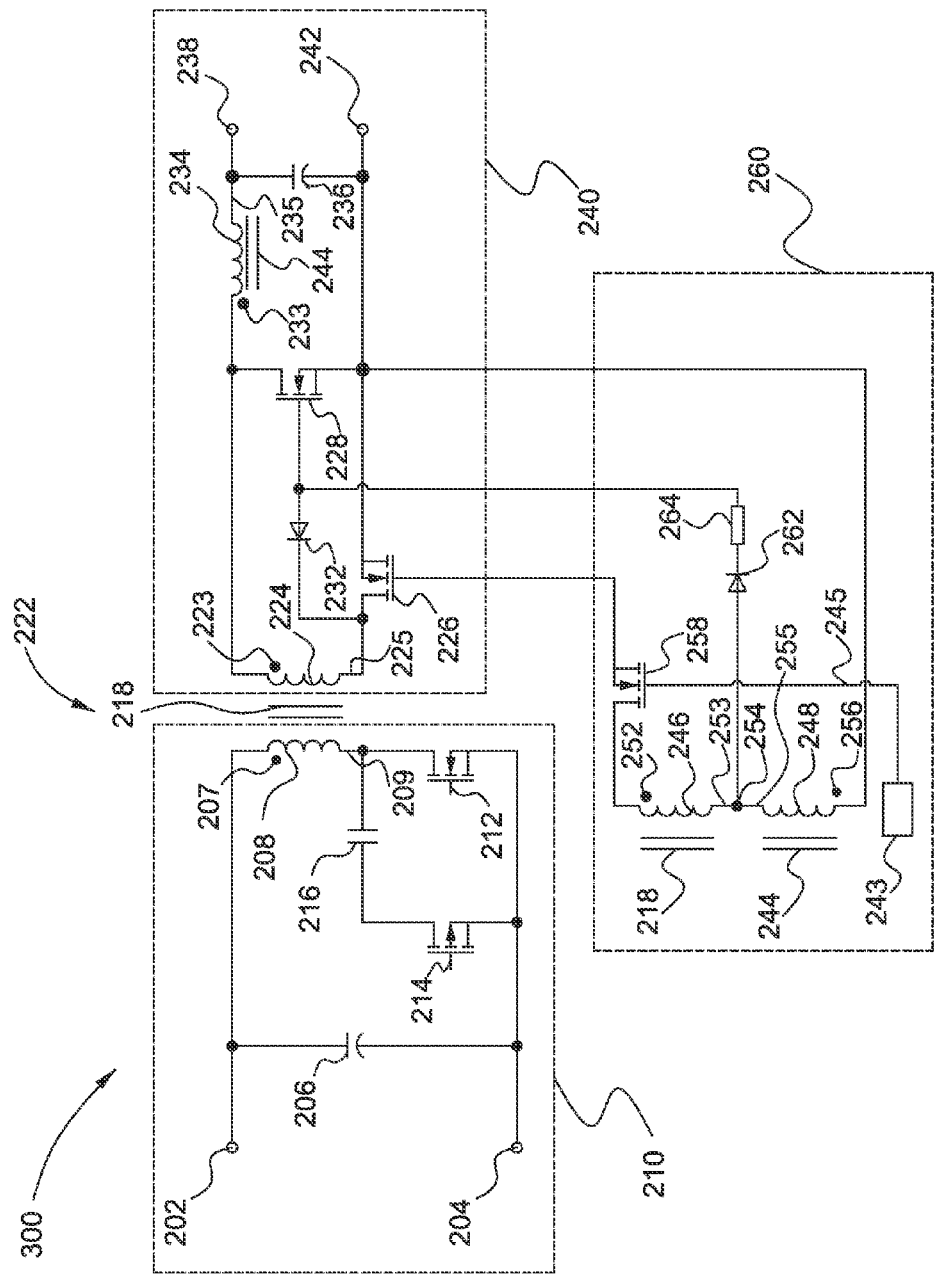
FIG. 3 is a detailed circuit diagram of a power converter in accordance with another exemplary embodiment of the present disclosure.

FIG. 3 is a detailed circuit diagram of a power converter 300 in accordance with another exemplary embodiment of the present disclosure. The power converter 300 illustrated in FIG. 3 is substantially similar to the power converter 200 shown in FIG. 2. Thus, same elements of the power converter 300 as those shown in FIG. 2, such as primary side power circuit 210, secondary side power circuit 240, and drive circuit 260 etc., are labeled with the same reference numerals. Comparing to the power converter 200 shown in FIG. 2, one of the differences of the power converter 300 shown in FIG. 3 is that the drive circuit 260 may further include a resistive element such as a resistor 264, which is electrically coupled between the first terminal 255 of the inductor auxiliary winding 248 and the gate terminal of the synchronous freewheeling switch 228. More specifically, the resistive element or the resistor 264 is electrically coupled between the cathode of the first diode 262 and the gate terminal of the synchronous rectifier switch 228. In practical applications, the resistive element 264 can be set with a fixed resistance value or with a variable resistance value. Therefore, the dead time existing between the gating signals for driving the synchronous rectifier switch 226 and the synchronous freewheeling switch 228 can be adjusted to ensure reliable switching of the synchronous rectifier switch 226 and the synchronous freewheeling switch 228. One example of the dead time is shown as the time period of $t_1$-$t_2$ and $t_3$-$t_4$ in FIG. 4.

Figure 5:
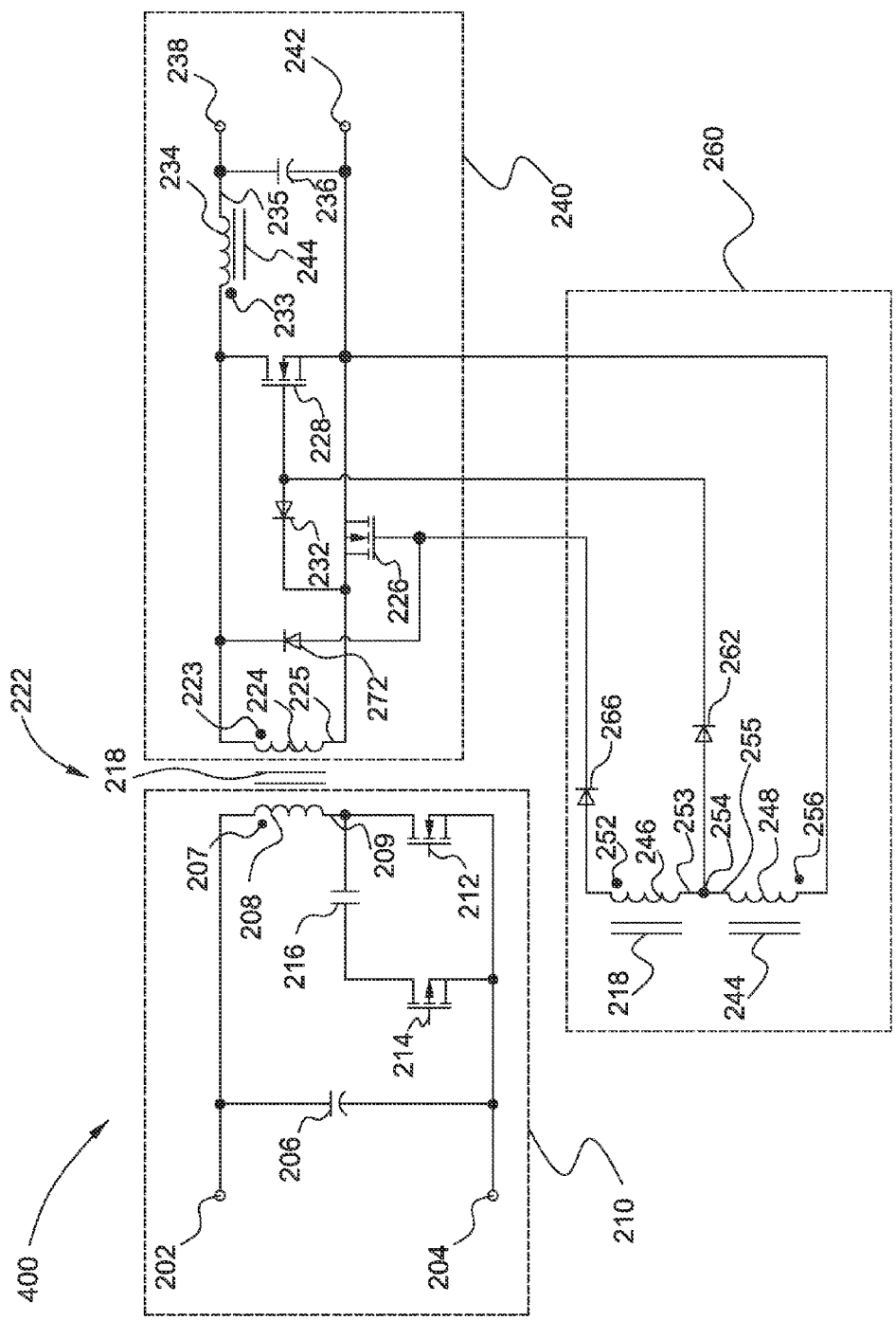
FIG. 5 is a detailed circuit diagram of a power converter in accordance with another exemplary embodiment of the present disclosure.

FIG. 5 is a detailed circuit diagram of a power converter 400 in accordance with another exemplary embodiment of the present disclosure. The power converter 400 illustrated in FIG. 5 is substantially similar to the power converters 200, 300 shown in FIGS. 2 and 3, respectively. Thus, same elements of the power converter 300 as those shown in FIGS. 2 and 3, such as primary side power circuit 210, secondary side power circuit 240, and drive circuit 260 etc., are labeled with the same reference numerals. In the illustrated embodiment of FIG. 5, the drive circuit 260 is particularly designed as a totally passive drive circuit. More specifically, the drive circuit switches 258 as those shown in FIGS. 2 and 3 are removed from the drive circuit 260. In one embodiment, the primary winding 208, the secondary winding 224, the transformer auxiliary winding 246, the output inductor winding 224, and the inductor auxiliary winding 248 are arranged to satisfy the following equation:

$$N_{as}/N_p - N_s/N_p \cdot N_{al}/N_l = 0 \quad (7).$$

The following equation can be derived by substituting the equation (7) into equation (3):

$$V_{AB} = V_o \cdot N_{al}/N_l \quad (8).$$

It can be known from equation (8) that the voltage between the first terminal 252 of the transformer auxiliary winding 246 and the second terminal 256 of the inductor auxiliary winding 248 is free from change of the input DC voltage at the first and second input ports 202, 204. That is, the voltage $V_{AB}$ remains unchanged even the input DC voltage changes from a low input voltage value to a high input voltage value, which warrants the removal of the drive circuit switch 258.

In the illustrated embodiment, the drive circuit 260 further includes a second diode 266, which has an anode electrically coupled to the first terminal 252 of the transformer auxiliary winding 246 and a cathode electrically coupled to the gate terminal of the synchronous rectifier switch 226. In some embodiments, the secondary side power circuit 240 may further include a second diode 272, which has a anode electrically coupled to the gate terminal of the synchronous rectifier switch 226 and a cathode electrically coupled to the drain terminal of the synchronous rectifier switch 228 and further coupled to the first terminal 223 of the secondary winding 224.

During normal operation of the power converter 400 shown in FIG. 5, the second diode 266 is turned on to conduct electrical current in response to the positive voltage induced at the first terminal 252 of the transformer auxiliary winding 246 when the main switch 212 is turned on. The synchronous rectifier switch 226 is turned on after the second diode 266 is turned on. At the same time, the first diode 262 is turned off or blocks electrical current in response to the negative voltage induced at the joint connection point 254 or the first terminal 255 of the inductor auxiliary winding 248, which in turns causes the synchronous freewheeling switch 228 to be turned off. In addition, the anode of the first diode 232 or the gate terminal of the synchronous freewheeling switch 228 is clamped at a low level voltage due to the synchronous rectifier switch 226 being turned on. As a result, the synchronous freewheeling switch 228 can be reliably turned off or maintained at the off status.

On the other hand, when the main switch 212 is turned off, the second diode 266 is turned off to block electrical current in response to a negative voltage applied at the first terminal 252 of the transformer auxiliary winding 246, which in turn causes the synchronous rectifier switch 226 to be turned off. At the same time, the first diode 262 is turned on to conduct electrical current in response to the positive voltage applied at the joint connection point 254 or the first terminal 255 of the inductor auxiliary winding 248. The synchronous freewheeling switch 228 is turned on when the first diode 262 is turned on. Therefore, the anode of the second diode 272 or the gate terminal of the synchronous rectifier switch 226 is clamped at a low level voltage due to the turn on of the synchronous freewheeling switch 228, such that the synchronous rectifier switch 226 can be reliably turned off or maintained at the off status. That is, the synchronous rectifier switch 226 and the synchronous freewheeling switch 228 are turned on and/or off in a complementary manner.

Figure 6:
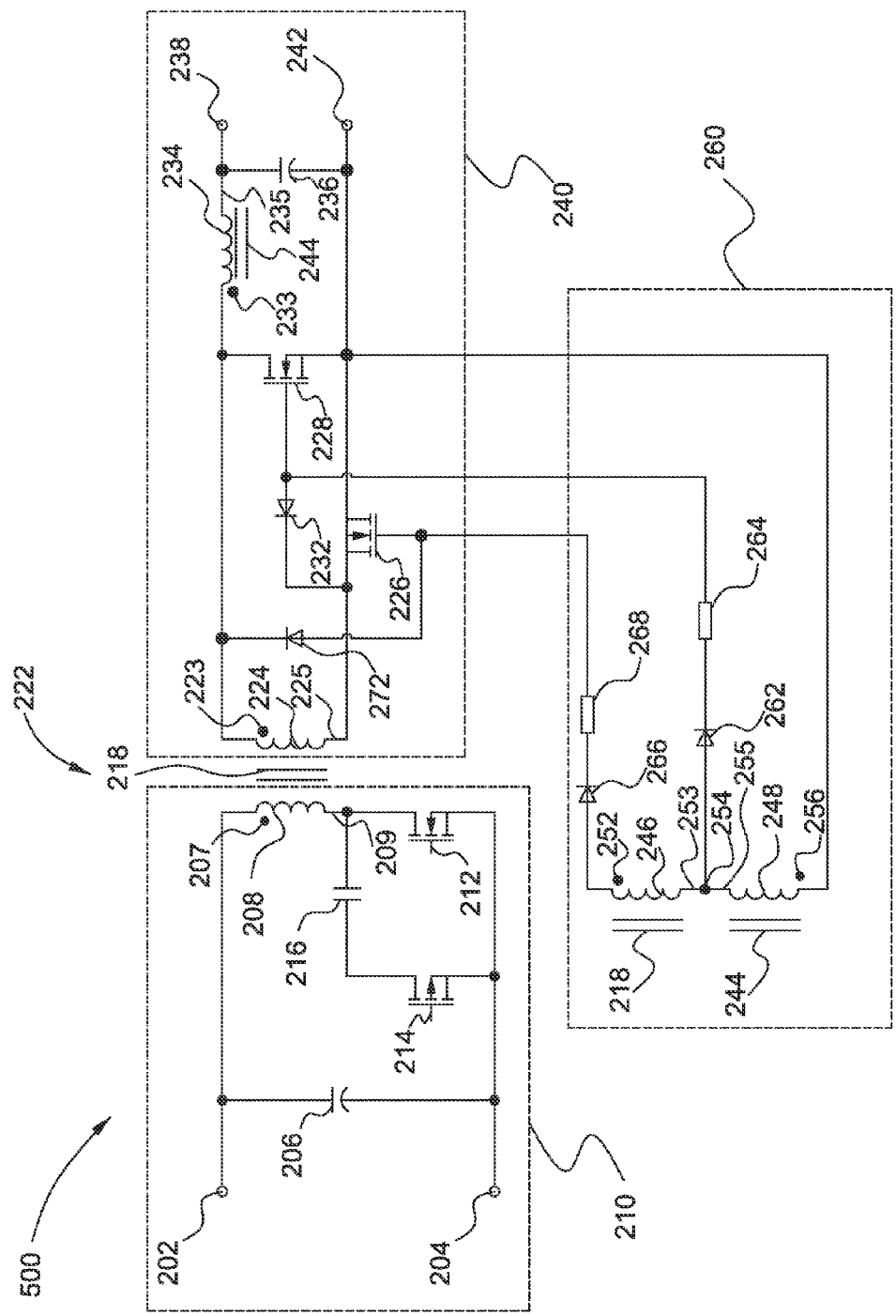
FIG. 6 is a detailed circuit diagram of a power converter in accordance with another exemplary embodiment of the present disclosure.

FIG. 6 is a detailed circuit diagram of a power converter 500 in accordance with another exemplary embodiment of the present disclosure. The power converter 500 illustrated in FIG. 6 is substantially similar to the power converter 400 shown in FIG. 5. Thus, same elements of the power converter 500 as those shown in FIG. 5, such as primary side power circuit 210, secondary side power circuit 240, and drive circuit 260 etc., are labeled with the same reference numerals. In the illustrated embodiment of FIG. 6, the drive circuit 260 is similarly arranged as a totally passive drive circuit. In addition, the drive circuit 260 may further include a first resistive element 264 and a second resistive element 268, both of which may be resistors in a specific embodiment. The first resistive element 264 is electrically coupled between the cathode of the first diode 262 and the gate terminal of the synchronous freewheeling switch 228. The second resistive element 268 is electrically coupled between the cathode of the second diode 266 and the gate terminal of the synchronous rectifier switch 226. In practical applications, the first resistive element 264 and the second resistive element 268 can be set with fixed resistance value or with variable resistance value, such that the dead time existing between the control signals or gating signals supplied to the synchronous rectifier switch 226 and the synchronous freewheeling switch 228 can be adjusted to ensure reliable switching of the two switches 226, 228 or to avoid short-circuit conditions caused by simultaneously turning on the two switches 226, 228.

Figure 7:
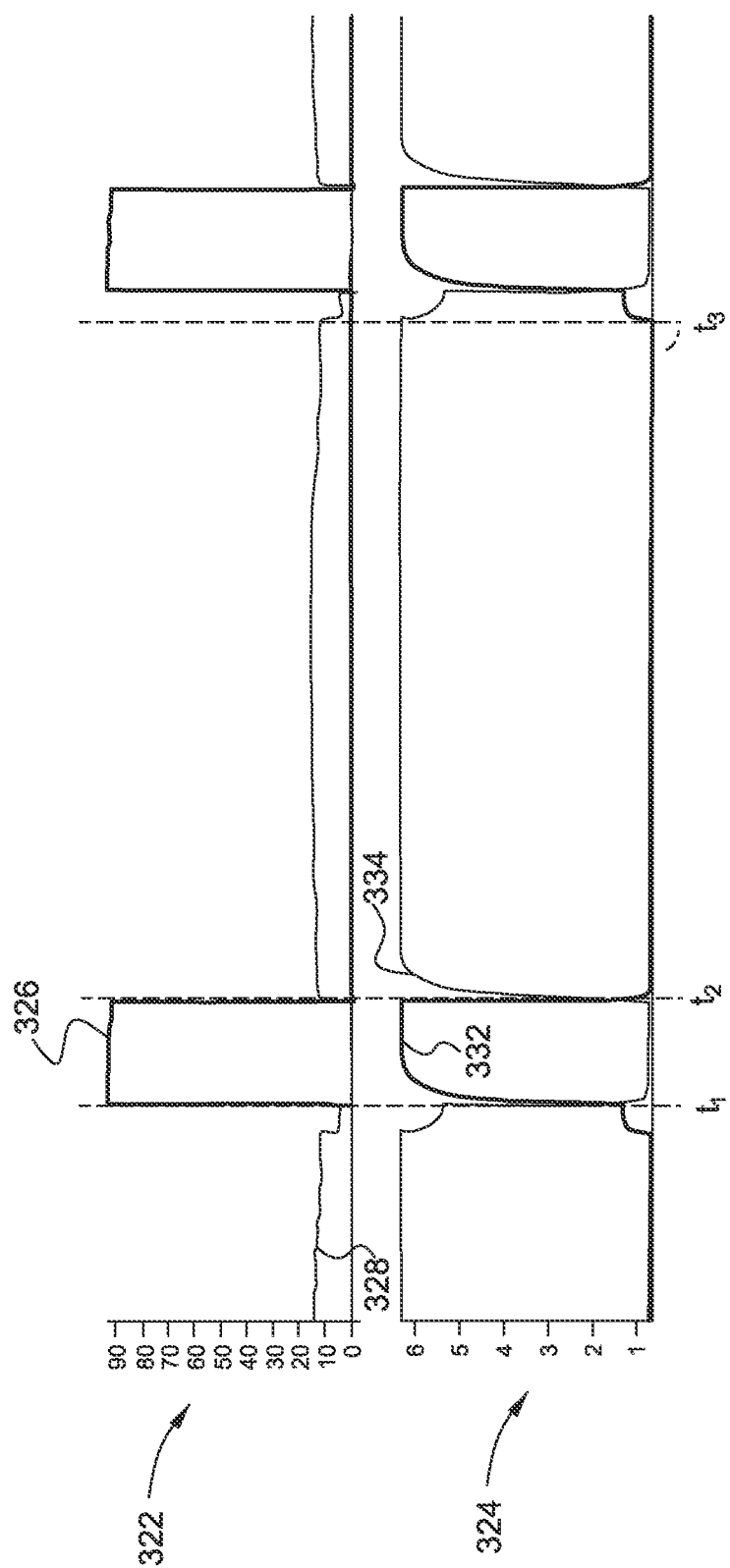
FIG. 7 shows various waveform diagrams generated by the power converters shown in FIG. 5 and/or FIG. 6 under a first operation condition in accordance with one exemplary embodiment of the present disclosure.
Figure 8:
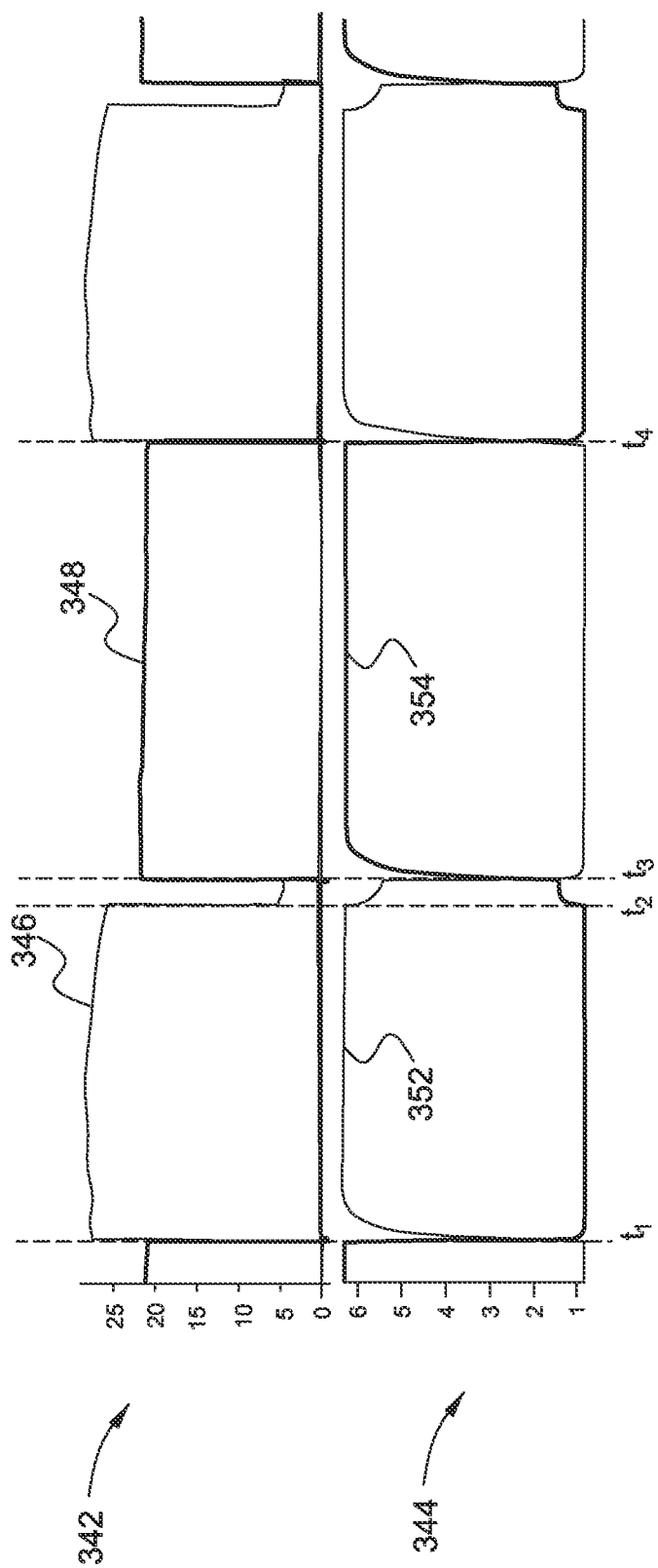
FIG. 8 shows various waveform diagrams generated by the power converters shown in FIG. 5 and/or FIG. 6 under a second operation condition in accordance with one exemplary embodiment of the present disclosure.

FIG. 7 shows voltage waveforms 322, 324 generated by the power converters 400, 500 shown in FIG. 5 and/or FIG. 6 under a first operation condition in accordance with one exemplary embodiment of the present disclosure. FIG. 8 shows voltage waveforms 342, 344 generated by the power converters 400, 500 shown in FIG. 5 and/or FIG. 6 under a second operation condition in accordance with one exemplary embodiment of the present disclosure. In some specific embodiments, the first operation condition includes the following parameters, in which the input voltage at the two input ports 202, 204 is 75 volts, the DC output voltage at the two output ports 238, 242 is 12 volts, the output current is 6 ampere, the primary winding 208 has a coil turn of 4, the secondary winding 224 has a coil turn of 5, the transformer auxiliary winding 246 has a coil turn of 3, the output inductor winding 244 has a coil turn of 5, and the inductor auxiliary winding 248 has a coil turn of 3. The second operation condition is substantially similar to the first operation condition, and the only difference is that the input DC voltage at the two input ports 202, 204 is 18 volts. Therefore, according to equation (8), the voltage applied to the gate terminal of the synchronous rectifier switch 226 is held constant of 7.2−0.7=6.5 volts under both of the two operation conditions.

As shown in FIG. 7, during the time period of $t_1$-$t_2$, the synchronous rectifier switch 226 is turned on, the voltage between the gate terminal and the source terminal of the synchronous rectifier switch 226 is about 6.5 volts (as indicated by 332), and the voltage between the drain terminal and the source terminal of the synchronous rectifier switch 226 is about 0 volt (as indicated by 328). In addition, during this time period of $t_1$-$t_2$, the synchronous freewheeling switch 228 is turned off, the voltage between the gate terminal and the source terminal of the synchronous freewheeling switch 228 is about 0 volt (as indicated by 334), and voltage between the drain terminal and source terminal of the synchronous freewheeling switch 228 is about 90 volts (as indicated by 326).

Further referring to FIG. 7, during the time period of $t_2$-$t_3$, the synchronous rectifier switch 226 is turned off, the voltage between the gate terminal and the source terminal of the synchronous rectifier switch 226 is about 0 volt, and the voltage between the drain terminal and the source terminal of the synchronous rectifier switch 226 is about 15 volts. In addition, during this time period of $t_2$-$t_3$, the synchronous freewheeling switch 228 is turned on, the voltage between the gate terminal and the source terminal of the synchronous freewheeling switch 228 is about 6.5 volts, and voltage between the drain terminal and source terminal of the synchronous freewheeling switch 228 is about 0 volt.

Referring to FIG. 8, during the time period of $t_1$-$t_2$, the synchronous freewheeling switch 228 is turned on, the voltage between the gate terminal and the source terminal of the synchronous rectifier switch 226 is about 6.5 volt (as indicated by 352), and the voltage between the drain terminal and the source terminal of the synchronous freewheeling switch 228 is about 0 volt (as indicated by 348). In addition, during this time period of $t_1$-$t_2$, the synchronous rectifier switch 226 is turned off, the voltage between the gate terminal and the source terminal of the synchronous rectifier switch 226 is about 0 volt (as indicated by 354), and voltage between the drain terminal and source terminal of the synchronous rectifier switch 226 is about 25 volts (as indicated by 346).

Further referring to FIG. 8, during the time period of $t_3$-$t_4$, the synchronous freewheeling switch 228 is turned off, the voltage between the gate terminal and the source terminal of the synchronous freewheeling switch 228 is about 0 volt, and the voltage between the drain terminal and the source terminal of the synchronous freewheeling switch 228 is about 20 volts. In addition, during this time period of $t_3$-$t_4$, the synchronous rectifier switch 226 is turned on, the voltage between the gate terminal and the source terminal of the synchronous rectifier switch 226 is about 6.5 volts, and voltage between the drain terminal and source terminal of the synchronous rectifier switch 226 is about 0 volt.

Figure 9:
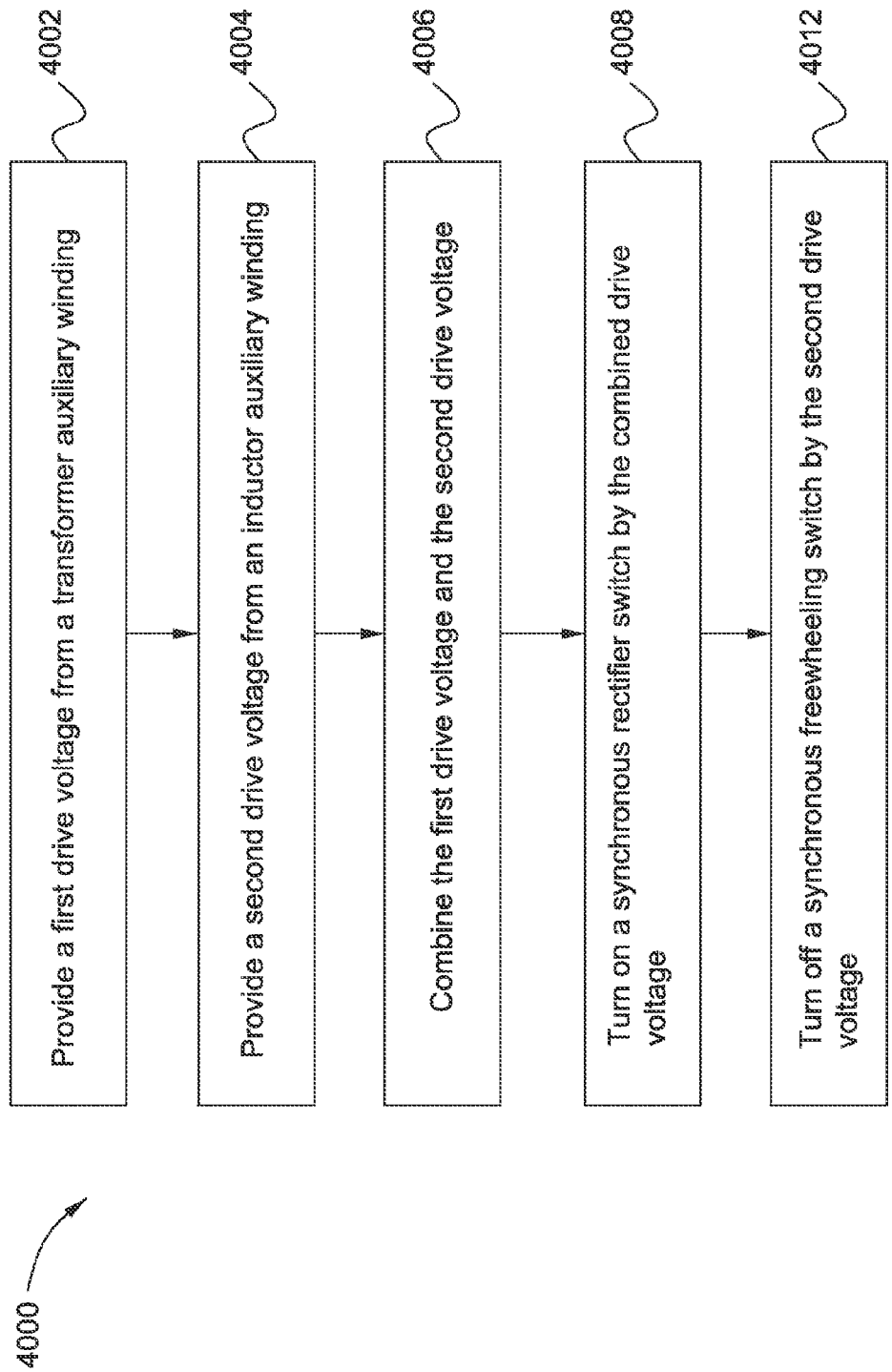
FIG. 9 is a flowchart diagram illustrating various blocks/actions of a method for operating a power converter in accordance with one exemplary embodiment of the present disclosure.

FIG. 9 is a flowchart diagram illustrating various blocks/actions of a method 4000 for operating at least one of power converters 200, 300, 400, 500 in accordance with one exemplary embodiment of the present disclosure.

As shown in FIG. 9, the method 4000 may start at process block 4002, where a first drive voltage is provided at a transformer auxiliary winding. In one embodiment, as shown in FIG. 2 for example, the transformer auxiliary winding 246 is magnetically coupled to a primary winding 208. When the main switch 212 is turned on, the first drive voltage induced at the first terminal 252 of the transformer auxiliary winding 246 has positive polarity.

In one embodiment, the method 4000 may further include a process block 4004. At process block 4004, a second drive voltage is provided at an inductor auxiliary winding. In one embodiment, as shown in FIG. 2 for example, the inductor auxiliary winding 248 is magnetically coupled to an output inductor winding 244. When the main switch 212 is turned on, the second drive voltage induced at the second terminal 256 of the inductor auxiliary winding 248 has positive polarity, which is also in the same phase as the first drive voltage. Although the process block 4004 is shown as subsequent to the process block 4002, in other embodiments, the process block 4004 can be arranged prior to the process block 4002, or concurrent with the process block 4002.

In one embodiment, the method 4000 may further include a process block 4006. At process block 4006, the first drive voltage provided at process block 4002 and the second drive voltage provided at process block 4004 are combined. In one specific embodiment, the first drive voltage and the second drive voltage are combined in a particular manner to allow the voltage between the first terminal 252 of the transformer auxiliary winding 246 and the second terminal 256 of the inductor auxiliary winding 248 is reduced to value that is significantly lower than the drive voltage induced at the transformer auxiliary winding. Therefore, the power consumption generated by the drive circuit switch is significantly reduced, which in turn leads to a reduced thermal stress on the drive circuit or the synchronous rectifier.

In one embodiment, the method 4000 may further include a process block 4008. At process block 4008, the combined drive voltage provided at process block 4006 is applied to the synchronous rectifier switch. For example, the positive voltage between the first terminal 252 of the transformer auxiliary winding 246 and the second terminal 256 of the inductor auxiliary winding 248 is applied to turn on the drive circuit switch 258, which in turn turns on the synchronous rectifier switch 226.

In one embodiment, the method 4000 may further include a process block 4012. At process block 4012, the second drive voltage provided at process block 4004 is applied to the synchronous freewheeling switch. For example, the negative voltage at the second terminal 255 of the inductor auxiliary winding 248 is applied to make the first diode 262 block electrical current, such that the synchronous freewheeling switch 228 is turned off. Therefore, the secondary side power circuit 240 can perform rectifying operations to provide a DC voltage at the two output ports 238, 242.

Figure 10:
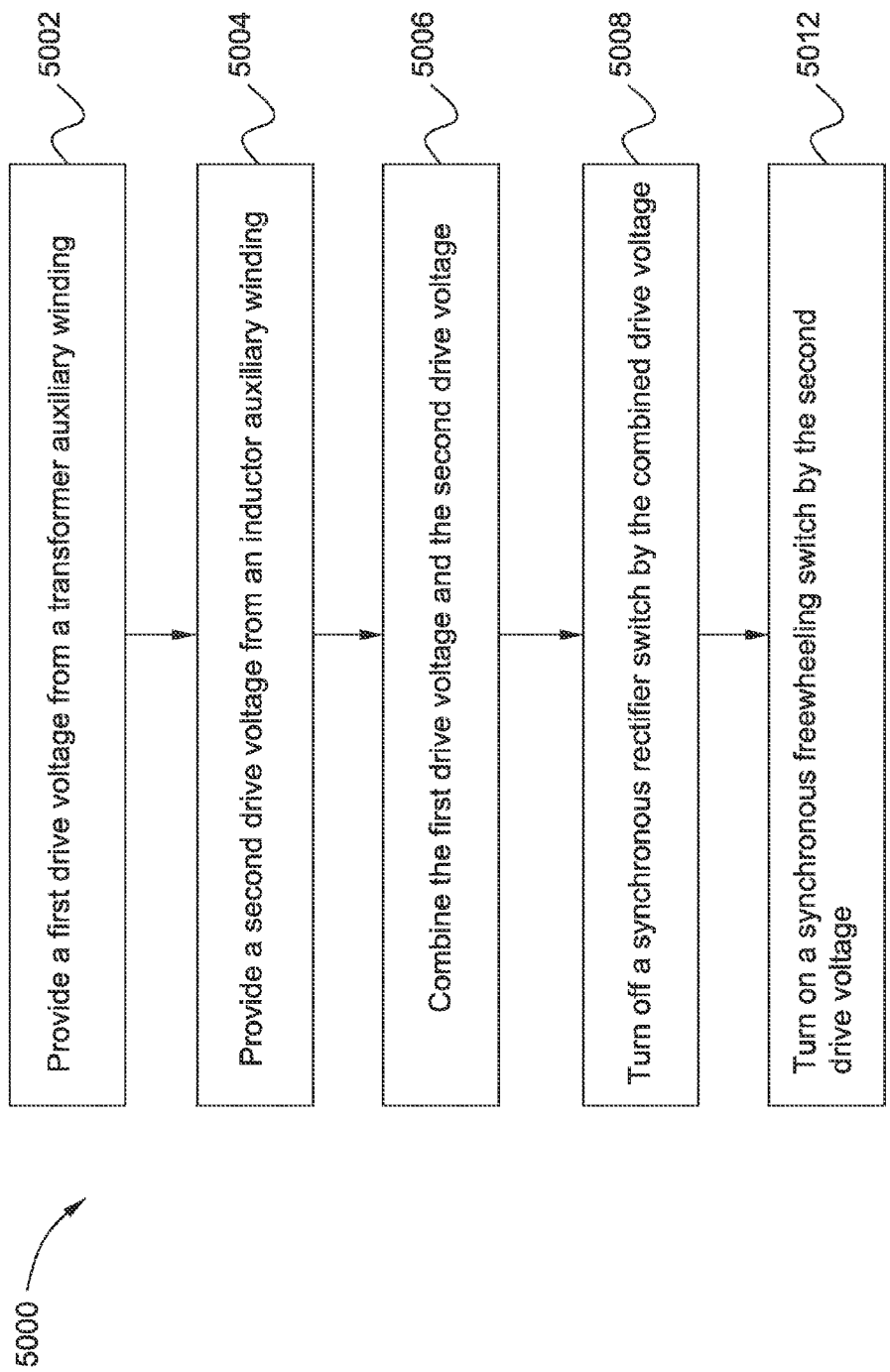
FIG. 10 is a flowchart diagram illustrating various blocks/actions of a method for operating a power converter in accordance with another exemplary embodiment of the present disclosure.

FIG. 10 is a flowchart diagram illustrating various blocks/actions of a method 5000 for operating at least one of power converters 200, 300, 400, 500 in accordance with one exemplary embodiment of the present disclosure.

As shown in FIG. 10, the method 5000 may start at process block 5002, where a first drive voltage is provided at a transformer auxiliary winding 246 (shown in FIG. 2) wound around a transformer 222. In one embodiment, the transformer auxiliary winding 246 is magnetically coupled to a primary winding 208. When the main switch 212 is turned off, the first drive voltage induced at the first terminal 252 of the transformer auxiliary winding 246 has negative polarity.

In one embodiment, the method 5000 may further include a process block 5004. At process block 5004, a second drive voltage is provided at an inductor auxiliary winding 248. In one embodiment, the inductor auxiliary winding 248 is magnetically coupled to an output inductor winding 244. When the main switch 212 is turned off, the second drive voltage induced at the second terminal 256 of the inductor auxiliary winding 248 has negative polarity, which is also in the same phase as the first drive voltage. Although the process block 5004 is shown as subsequent to the process block 5002, in other embodiments, the process block 5004 can be arranged prior to the process block 5002, or concurrent with the process block 5002.

In one embodiment, the method 5000 may further include a process block 5006. At process block 5006, the first drive voltage provided at process block 5002 and the second drive voltage provided at process block 5004 are combined.

In one embodiment, the method 5000 may further include a process block 5008. At process block 5008, the combined drive voltage provided at process block 5006 is applied to the synchronous rectifier switch. For example, the negative voltage between the first terminal 252 of the transformer auxiliary winding 246 and the second terminal 256 of the inductor auxiliary winding 248 is applied to turn off the drive circuit switch 258, which in turn turns off the synchronous rectifier switch 226.

In one embodiment, the method 5000 may further include a process block 5012. At process block 5012, the second drive voltage provided at process block 5004 is applied to the synchronous freewheeling switch. For example, the positive voltage at the second terminal 255 of the inductor auxiliary winding 248 is applied to turn on the first diode 262, which in turn turns on the synchronous freewheeling switch 228. Therefore, the secondary side power circuit 240 can perform rectifying operations to provide a DC voltage at the two output ports 238, 242.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power converter, comprising:
a primary side power circuit comprising a primary winding and a main switch coupled in series with the primary winding, the main switch configured to be turned on and off in response to main switch control signals supplied thereto;
a secondary side power circuit comprising a secondary winding, a synchronous rectifier switch, a synchronous freewheeling switch, and an output inductor winding, the secondary winding inductively coupled to the primary winding and forming a first magnetic coupling with the primary winding;
a synchronous rectifier drive circuit comprising a first auxiliary winding and a second auxiliary winding coupled in series with the first auxiliary winding, the first auxiliary winding inductively coupled to the primary winding and forming a second magnetic coupling with the primary winding, and the second auxiliary winding inductively coupled to the output inductor winding and forming a third magnetic coupling with the output inductor winding;
the synchronous rectifier switch and the synchronous freewheeling switch configured to be turned on and off substantially in a complementary manner, and wherein the synchronous rectifier switch is turned on in correspondence with an on period of the main switch and is turned off in correspondence with an off period of the main switch; and
wherein the synchronous rectifier drive circuit comprises a drive circuit switch coupled between a first terminal of the first auxiliary winding and a gate terminal of the synchronous rectifier switch, a second terminal of the first auxiliary winding is coupled to a first terminal of the second auxiliary winding and further coupled to a gate terminal of the synchronous freewheeling switch, a second terminal of the second auxiliary winding is coupled to ground;
wherein the secondary side power circuit further comprises a first diode coupled to a joint connection point between the first auxiliary winding and the second auxiliary winding, further having the anode directly coupled to the gate terminal of the synchronous freewheeling switch and a cathode directly coupled to a drain terminal of the synchronous rectifier switch and the secondary winding.

2. The power converter of claim 1, wherein a first voltage developed at the first terminal of the first auxiliary winding is substantially in phase with a second voltage developed at the second terminal of the second auxiliary winding when the main switch is turned on.

3. The power converter of claim 1, wherein the gate terminal of the drive circuit switch is supplied with a substantially constant bias voltage.

4. The power converter of claim 1, wherein the synchronous rectifier drive circuit comprises a second diode having an anode coupled to the joint connection point between the first auxiliary winding and the second auxiliary winding and a cathode coupled to the gate terminal of the synchronous freewheeling switch.

5. The power converter of claim 1, wherein the synchronous rectifier drive circuit comprises a resistor coupled between a joint connection point between the first auxiliary winding and the second auxiliary winding and the gate terminal of the synchronous freewheeling switch.

6. The power converter of claim 1, wherein the primary winding, secondary winding, first auxiliary winding, output inductor winding, and the second auxiliary winding are arranged to satisfy the following equation:

$$\frac{N_{as}}{N_p} - \frac{N_s}{N_p} \cdot \frac{N_{al}}{N_l} = 0,$$

where $N_p$ is a number of turns of the primary winding, $N_s$ is a number of turns of the secondary winding, $N_{as}$ is a number of turns of the first auxiliary winding, $N_l$ is a number of turns of the output inductor winding, and $N_{al}$ is a number of turns of the second auxiliary winding.

7. The power converter of claim 6, wherein the synchronous rectifier drive circuit comprises a first diode having an anode coupled to a joint connection point between the first auxiliary winding and the second auxiliary winding and a cathode coupled to the gate terminal of the synchronous freewheeling switch.

8. The power converter of claim 7, wherein the synchronous rectifier drive circuit comprises a first resistor coupled between a joint connection point between the first auxiliary winding and the second auxiliary winding and the gate terminal of the synchronous freewheeling switch.

9. The power converter of claim 6, wherein the drive circuit switch comprises a second diode having an anode coupled to a first terminal of the first auxiliary winding and a cathode coupled to the gate terminal of the synchronous rectifier switch.

10. The power converter of claim 9, wherein the drive circuit switch comprises a second resistor coupled between the first terminal of the first auxiliary winding and the gate terminal of the synchronous rectifier switch.

11. The power converter of claim 6, wherein the secondary side power circuit comprises a first diode having an anode coupled to the gate terminal of the synchronous freewheeling switch and a cathode coupled to a drain terminal of the synchronous rectifier switch.

12. The power converter of claim 6, wherein the secondary side power circuit comprises a second diode having an anode coupled to the gate terminal of the synchronous rectifier switch and a cathode coupled to a first terminal of the secondary winding.

13. A self-driven DC-DC power converter of forward type, comprising:
- a transformer having a primary winding, a secondary winding, and a first auxiliary winding wound around a common core, the secondary winding having a first terminal and a second terminal, the first auxiliary winding having a first terminal and a second terminal;
- a synchronous rectifier switch having a source terminal, a drain terminal, and a gate terminal, the drain terminal of the synchronous rectifier switch coupled to the second terminal of the secondary winding, the gate terminal of the synchronous rectifier switch coupled to the first terminal of the first auxiliary winding;
- a synchronous freewheeling switch having a source terminal, a drain terminal, and a gate terminal, the source terminal of the synchronous freewheeling switch coupled to the source terminal of the synchronous rectifier switch, the drain terminal of the synchronous freewheeling switch coupled to the first terminal of the secondary winding;
- an output inductor winding coupled in series with the secondary winding;
- a second auxiliary winding inductively coupled with the output inductor winding, the second auxiliary winding having a first terminal and a second terminal, the first terminal of the second auxiliary winding coupled to the second terminal of the first auxiliary winding and the gate terminal of the synchronous freewheeling switch; and
- a drive circuit switch having a drain terminal, a source terminal, and a gate terminal, the drain terminal of the drive circuit switch coupled to the first terminal of the first auxiliary winding, the source terminal of the drive circuit switch coupled to the gate terminal of the synchronous rectifier switch, and the gate terminal of the drive circuit switch coupled to a substantially stable voltage source;
- a first diode having an anode coupled to a joint connection point between the first auxiliary winding and the second auxiliary winding, further having the anode directly coupled to the gate terminal of the synchronous freewheeling switch and a cathode directly coupled to a drain terminal of the synchronous rectifier switch and the secondary winding.

14. The self-driven DC-DC power converter of claim 13, wherein a first voltage developed at the first terminal of the first auxiliary winding has substantially the same polarity as a second voltage developed at the second terminal of the second auxiliary winding.

* * * * *